United States Patent

[11] 3,631,517

| [72] | Inventors | Robert I. Morrison<br>Jenkintown;<br>Peter H. Batchelar, Bucks County, both of Pa. |
|---|---|---|
| [21] | Appl. No. | 28,806 |
| [22] | Filed | Apr. 15, 1970 |
| [45] | Patented | Dec. 28, 1971 |
| [73] | Assignee | Honeywell Inc.<br>Minneapolis, Minn. |

[54] ADJUSTABLE BEARING FOR PEN
7 Claims, 4 Drawing Figs.

[52] U.S. Cl. .................................................. 346/139 C
[51] Int. Cl. ................................................. G01d 15/00
[50] Field of Search .......................................... 346/140, 139 R, 139 C, 145, 49, 117

[56] References Cited
UNITED STATES PATENTS

| 2,132,808 | 10/1938 | Sigo ............................. | 346/49 X |
| 2,391,601 | 12/1945 | Thomas et al. ................ | 346/49 X |
| 2,724,631 | 11/1955 | Ruhland ....................... | 346/49 |
| 3,163,490 | 12/1964 | Thompson..................... | 346/139 |
| 3,350,717 | 10/1967 | Thomson...................... | 346/49 |

*Primary Examiner*—Joseph W. Hartary
*Attorneys*—Arthur H. Swanson, Lockwood D. Burton and John Shaw Stevenson ABSTRACT: A unitary bearing member for adjustably supporting a pen carrying arm of a recorder that provides No. 1 a means for permitting the rotary movement of the pen to be restricted to one of several preselected recording portions on a chart and No. 2 a pen arm adjustment that will increase or decrease the force that can be applied to a spring that forms a portion extending between the arm and the pen so that the best writing pen pressure of the pen on the chart can be achieved.

PATENTED DEC 28 1971 3,631,517
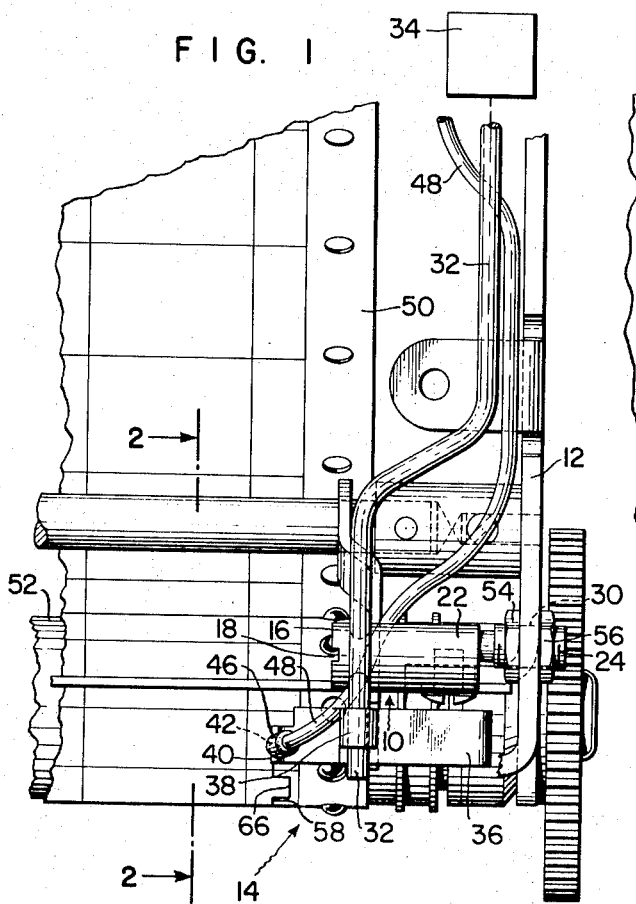
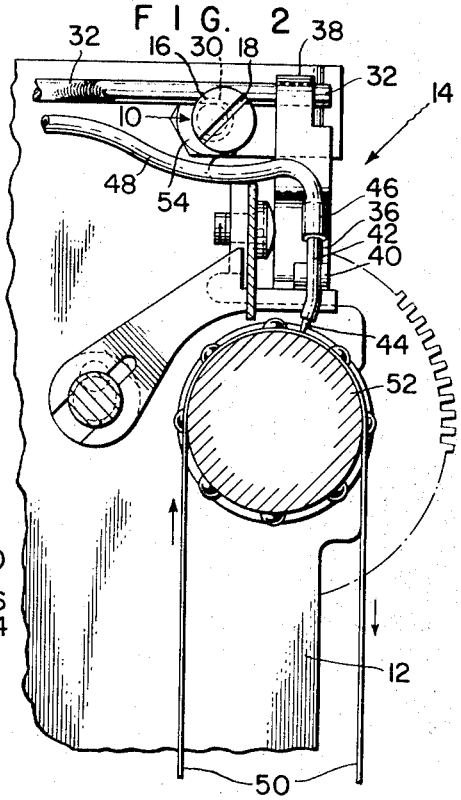
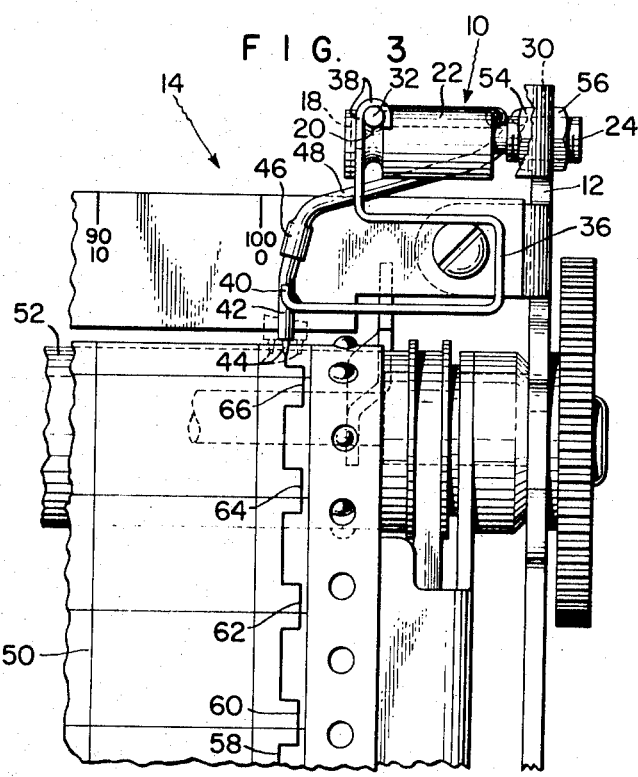
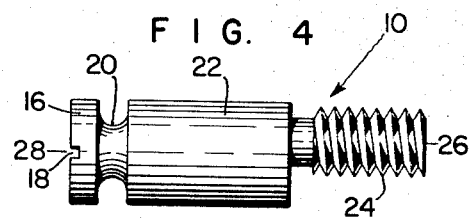
INVENTORS.
ROBERT I. MORRISON
PETER H. BATCHELAR
BY
John Shaw Stevenson
AGENT.

ADJUSTABLE BEARING FOR PEN

It is an object of the present invention to provide a longitudinally adjustable unitary bearing member for altering the selected area over which a pen arm and its associated pen can be moved along a chart to make a record thereon.

It is another object of the invention to provide a unitary bearing member of the aforementioned type that has a rotatable eccentric portion for adjusting the pressure that a spring, which extends between the pen arm and the pen, can apply by way of the pen to a chart.

It is another object of the present invention to provide the aforementioned adjustable bearing member for a pen arm which arm has one end connected to a solenoid for rotatable movement therewith and another opposite end connected by way of a leaf spring for moving a pen in spring biased engagement along a chart.

One of the problems encountered in the manufacture of pen actuating mechanisms in mass quantities for recorders is that it is difficult to maintain uniform tolerances for the parts that are combined to form these mechanisms. Consequently, when these parts are assembled some of them will possess certain undesired characteristics e.g., pen assemblies that apply excessive amounts of spring force to the tip of the pen that will cause the pen to tear the chart when it is moved therealong.

On the other hand some mass produced pen assemblies have been found to possess a spring force that is insufficient to maintain the tip of its associated pen in good recording contact with the chart and this can result in either a failure of the pen to record a line on the chart or the recording of only a part of the desired record line commonly referred to as skipping.

Another problem resulting from the aforementioned nonuniform tolerances encountered in the manufacture of pen actuating mechanism is that the recording area over which a pen, e.g., an event pen, is allowed to travel may be spaced too far a distance inwardly from the edge of the chart where it would interfere with the traversed area of the chart over which a second pen, commonly referred to as a servo pen, is recording a variable condition.

It has also been found for the aforementioned reason that other pen assemblies may find themselves in an undesired assembled position in which they are too close to or overlap the margin of the chart of which the event that they are recording is to be made.

In order to solve the aforementioned problems it is an object of the present invention to provide a unitary bearing member for No. 1. adjusting a pen for movement across a preselected portion of a chart and No. 2. adjusting the pressure being applied by the tip of the pen to a chart to a value that will provide a good clear continuous record line thereon.

More specifically it is an object of the present invention to provide a unitary bearing member of the aforementioned type in which the pen employed is an event pen that can always be positioned by the apparatus provided herein for movement along a selected longitudinal edge of a chart while a desired amount of chart contact pressure is applied thereto.

A better understanding of the present invention may be had from the following detailed description when read in connection with the accompanying drawings in which:

FIG. 1 is a plan view of the unitary horizontal adjustable positioned bearing member shown mounted on a sidewall portion of the recorder to retain a pen in one of its many different positions for preselected movement along a chart and further shows a slotted means located at the end of this bearing member for rotating the member in order to change the predetermined pressure that is applied by the tip of the pen against the chart.

FIG. 2 is a sectional elevation view taken along the line 2—2 of FIG. 1.

FIG. 3 is a elevation view of the adjustable bearing shown in FIG. 1 and

FIG. 4 shows a detail of the bearing member shown in FIGS. 1–3.

Referring now to the drawings in detail there is shown in FIGS. 1–3 a typical way in which the unique unitary dual purpose bearing member 10, that is shown in detail in FIG. 4, can be mounted for use on a sidewall 12 of a strip chart recorder 14.

The bearing member 10 has a head portion 16 which has a sidewall 18, an annular grooved-out wall portion 20, an intermediate portion 22 and a threaded end portion 24.

The wall portion 20 has an annular surface that is of a cam-shaped configuration and which may be spaced at increasing radial distances from its longitudinal axis.

The threaded end portion 24 of the bearing member 10 is shown as having a longitudinal axis 26 that is displaced and parallel to the axis 28 shown for the remaining portion of the member 10.

The threaded end portion 24 is shown in FIG. 1–3 as being threadedly engaged with a wall 30 formed in the sidewall of the recorder 14 that has internal threads formed thereon.

When the pen arm 32 is in its unassembled position it is of a bowed shaped construction between its ends and takes a nonsprung position below the bearing member 10. When assembled the outer pen end of the arm 32 is moved to the left side of the bearing member 10, lifted in an upward direction forcing it into a substantially horizontal position in order to store a spring force therein, moved along the top of the bearing member 10 and allowed to exert its inherent spring bias force in a downward direction against the wall forming the groove 20.

When the pen arm is assembled in the horizontal position as shown in the annular grooved-out wall portion of the bearing member 10, it can be seen that the rear end of this pen arm 32 is operably connected for intentional rotation in an arcuate fashion with a commercially available rotatable solenoid 34.

An inherent and downward spring bias that is applied by the portion of the pen arm 32 at the front of the recorder carries a leaf spring 36 that is of a substantially channel-shaped construction and which has one curved end portion 38 extending upwardly and about the pen arm 32 that is fixedly connected for movement therewith.

A lower end portion 40 of the leaf spring 36 is shown fixedly connected by welding for supporting the unitary capillary tube 42 and pen 44 thereon. The upper end of the capillary tube 42 in turn is connected by a sleeve 46 to a flexible capillary 48 that in turn is connected to an ink source, not shown.

As is best shown in FIG. 2 the tip of the pen 44 is in contact with the surface of the strip chart 50. This chart 50 is as shown wrapped about a sprocket 52 for driving engagement therewith so that the chart can be withdrawn from a supply roll, not shown, and simultaneously transferred in a conventional fashion to a take up roll not shown in the direction of the arrows.

From the aforementioned description it can be seen that the spring force inherent in the pen arm 32 will apply a balance force that will not only keep it engaged with the groove 20 but also allow a certain portion of its downward applied spring force to be applied to the leaf spring 36 so that the tip of the pen may be retained in spring-biased engagement with the surface of the chart 50.

In order to enable the pen 44 to chart a continuous record of an event on the chart it is necessary that a preselected amount of spring force be applied to the pen by the pen arm 32 and leaf spring 36. Differences in tolerances of the parts that are assembled with this pen arising from the mass manufacturing of the parts has heretofore made it impossible to provide the desired amount of spring force to the pen so that a good clear continuous record line can be inscribed on the chart.

A cam-shaped groove 20 in bearing member 10 overcomes this difficulty by providing a way of adjusting the amount of spring force that the pen arm 32 can transfer to the pen 44.

If, for example, the pen is sprung into too tight of an engagement with the chart, this condition will cause the pen to tear the chart. A lessening of the force that the pen arm 32 is transferring to the pen 44 by way of the leaf spring 36 must be reduced in order to remedy this situation. This is accomplished by rotating the bearing member 10 manually, or by employing a screwdriver inserted in a groove 18, to a position where the distance between the longitudinal centerline passing through the bearing member parts 22 and 16 and the longitudinal centerline of the pen arm 32 is increased.

In a similar but opposite manner it can be seen that the bearing member 10 can be rotated in the opposite direction to that just described so as to increase the distance between the centerlines of the bearing member 10 and the pen arm 32 when the spring pressure of the pen arm being transmitted by the spring is below the desired level. This latter adjustment will allow the pen to inscribe a continuous line on the chart and will eliminate the previously mentioned desired pen skipping that occurs when the pen pressure against the paper is below a desired level.

Differences in manufacturing of the pen actuating parts and other related parts of the recorder 14 have caused event pens to be positioned either into the nonrecord marginal portion of the chart 50 or too far into the moving portion of the chart where they interfere with the operation of other servo pens that are recording the condition of one or more variables on the remaining portion of the chart.

To remedy this problem it can be seen that a threaded portion 24 is formed on the right end of the bearing member 10, whose longitudinal axis 26 is parallel to the longitudinal axis 28 associated with the remaining portions 16, 20, 22 of the bearing member 10.

When this threaded portion 24 of bearing member 10 is engaged with the internal threaded surface 30 of the sidewall of the recorder 14 this connection will enable the bearing member 10 to initially move the pen from either the right or left side of the position shown into the desired correct solid-line position as shown in FIG. 3. This adjustment is done in the event that the pen arm 32 and its associated spring 36 and pen 44 are initially located at a position that is either too far to the right or left of the correct solid-line position shown in the drawing. The aforementioned initial rotatable adjustment of the threaded end portion 24 of the bearing member 10 in the threaded sidewall portion of the recorder 14 is done while the locknuts 54, 56 are in positions that are spaced away from the sidewall 12 of the recorder 14. When the correct position of the pen arm 32 and its associated pen 44 are established, the locknuts 54, 56 are moved into a position against the respective opposite sidewall 12 of the recorder 14 so that the bearing member 10 cannot be moved to either the right or left of the position shown in FIG. 3.

It can also be seen that if the threaded portion 24 of the bearing member is of a fine threaded variety only a very small incremental amount of longitudinal movement of the pen arm 32 and its associated spring 36 and pen 44 will take place for each clockwise or counterclockwise rotation of the bearing member 10. With this arrangement, a single or many rotatable adjustments can be made to bring the pen into the correct transverse position on the chart 50 shown for example in FIG. 3 so that a continuous line 58 having indentations 60, 62, 64, 66 thereon can be inscribed on the chart to indicate when an event has occurred.

For each one of the rotations of the aforementioned fine thread adjustments of the threaded portion 24 in threaded sidewall 30 there will be an opportunity to adjust the spring force that the pen arm 32 is allowed to apply by way of the leaf spring 36 and the pen 44 to the chart 50 to some desired value that will effect a good continuous clear record of the occurrence of an event being recorded.

The rotary movement of bearing member 10 thus provides a unitary means which when rotated in either a clockwise or counterclockwise manner will simultaneously not only adjust a pen 44 so that it is in a correct position for recording on a chart 50 but also preselect the necessary pressure that will be applied by the pen to the chart to guarantee that a good continuous clear record is recorded thereon.

The embodiments of the invention in which an exclusive property or privilege is claimed are defined as follows:

1. A unitary elongated bearing member for adjustably supporting a rotatable pen carrying arm of a recorder thereon, comprising a wall forming a groove in said bearing member adapted to support the pen arm for rotary movement thereon, said bearing member having a means for adjustably positioning the wall forming the groove and its associated pen arm in one of a plurality of fixed positions on a wall of said recorder and wherein said groove is of a characteristic shape to affect the movement of the pen arm away from the longitudinal axis of the bearing member when the member is rotated in one direction and to affect the movement of the pen arm toward the longitudinal axis of the bearing member when the member is rotated in the opposite direction.

2. The pen arm bearing supporting member defined in claim 1 wherein successive outer circumferential surface portions of the groove on which said arm is supported is spaced at increasing radial distances from the longitudinal axis of the member.

3. The pen arm supporting member defined in claim 1 wherein the pen arm is operably connected by way of a channel-shaped spring portion to a pen, the groove formed in the bearing member is of a cam-shaped configuration and said rotation of the member provides a means of transmitting selected amounts of tension to said spring portion and to thereby provide a means of transmitting a preselected amount of pressure to the pen that is in contact with a chart.

4. The apparatus as defined in claim 1 wherein the adjustable connection between the bearing member and the wall of the recorder is comprised of a first threaded portion forming one end of the bearing member that has a longitudinal axis that is parallel to and displaced from the longitudinal axis of the remaining portion of the bearing member and a second threaded portion is formed in the wall of the recorder into which the first threaded portion is threadedly engaged.

5. The apparatus as defined in claim 1 wherein the adjustable connection between the bearing member and the wall of the recorder is comprised of a first threaded portion forming one end of the bearing member that has a longitudinal axis that is parallel to and displaced from the longitudinal axis of the remaining portion of the bearing member, a second threaded portion formed in the wall of the recorder into which the first threaded portion is threadedly engaged and a threaded nut connection is mounted on the first threaded portion at positions that are on the opposite sides of said wall to retain the first threaded portion in one of said fixed positions in the wall of the recorder.

6. The pen arm supporting member defined in claim 1 wherein the pen of the pen-carrying arm is connected to the arm by means of a spring that forms an outer extensible portion at one end of the arm and the opposite end of the arm is connected to a solenoid for intermittent rotation therewith to affect the simultaneous movement of the spring-biased pen across a chart.

7. The pen arm bearing supporting member defined in claim 1 wherein the adjustable means is constructed to rotatably move said bearing and its associated groove formed therein toward and away from the wall of the recorder and wherein the groove is of a cam-shaped configuration to enable the pen-carrying arm supported thereon to be moved toward a chart of said recorder while the adjustable means of said bearing member is rotatably moved in one of said two directions and to be moved away from said chart when the adjustable means is rotatably moved in said other direction.

* * * * *